United States Patent
Hara (10) Patent No.: US 7,126,349 B2
(45) Date of Patent: Oct. 24, 2006

(54) CAPACITANCE DETECTION APPARATUS, DRIVING METHOD FOR THE SAME, FINGERPRINT SENSOR, AND BIOMETRIC AUTHENTICATION APPARATUS

(75) Inventor: Hiroyuki Hara, Chino (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/911,674

(22) Filed: Aug. 5, 2004

(65) Prior Publication Data

US 2005/0062485 A1    Mar. 24, 2005

(30) Foreign Application Priority Data

Aug. 25, 2003    (JP)    ............ 2003-300053

(51) Int. Cl.
*G01R 27/26*    (2006.01)
(52) U.S. Cl. .................. 324/658; 324/661; 324/686
(58) Field of Classification Search ................ 324/658, 324/661, 686
See application file for complete search history.

(56) References Cited

U.S. PATENT DOCUMENTS

| | | | | |
|---|---|---|---|---|
| 6,028,773 | A * | 2/2000 | Hundt | 361/760 |
| 6,448,790 | B1 * | 9/2002 | Imai | 324/661 |
| 6,661,019 | B1 * | 12/2003 | Furusato et al. | 250/556 |
| 6,674,668 | B1 * | 1/2004 | Ikehashi et al. | 365/185.24 |
| 6,731,120 | B1 * | 5/2004 | Tartagni | 324/662 |
| 6,927,581 | B1 * | 8/2005 | Gozzini | 324/663 |

FOREIGN PATENT DOCUMENTS

| | | |
|---|---|---|
| JP | A 11-118415 | 4/1999 |
| JP | A 2000-346608 | 12/2000 |
| JP | A 2001-056204 | 2/2001 |
| JP | A 2001-133213 | 5/2001 |
| JP | A 2003-254706 | 9/2003 |

OTHER PUBLICATIONS

U.S. Appl. No. 10/808,523, filed Mar. 25, 2004, Hara.

\* cited by examiner

*Primary Examiner*—Walter Benson
(74) *Attorney, Agent, or Firm*—Oliff & Berridge, PLC (57) ABSTRACT

Aspects of the invention can provide a fingerprint sensor with high sensing precision. The fingerprint sensor according to the invention can include capacitance detection circuits that output detection signals, which each correspond to a capacitance formed between a subject surface and the fingerprint sensor, to signal transmitting paths, and an amplification circuit that amplifies the detection signals outputted to the signal transmitting paths. The individual signal transmitting paths can be respectively connected to at least two capacitance detection circuits and the fingerprint sensor further includes a resetting means that resets the potential of the signal transmitting paths before the detection signals are outputted from the capacitance detection circuits to the signal transmitting paths.

14 Claims, 7 Drawing Sheets

CAPACITANCE DETECTION APPARATUS, DRIVING METHOD FOR THE SAME, FINGERPRINT SENSOR, AND BIOMETRIC AUTHENTICATION APPARATUS

BACKGROUND OF THE INVENTION

1. Field of Invention

Aspects of the invention relate to a capacitance detecting technology for reading, as variations in capacitance, the surface form of a subject, such as a fingerprint, that has minute convexes and concaves.

2. Description of Related Art

Japanese Unexamined Patent Publication Nos. H11-118415, 2000-346608, 2001-56204, and 2001-133213 disclose a related technology where the surface of a sensor electrode formed on a single-crystal silicon substrate is covered with a dielectric film, the potential of a fingertip is set as a reference potential, and variations in the capacitance formed between a fingertip and sensor electrodes due to the convexes and concaves of the fingerprint are used to identify the fingerprint.

SUMMARY OF THE INVENTION

However, since related capacitance-type fingerprint sensors are formed on single-crystal silicon substrates, there has been the problem of the sensors breaking when firmly pressed with the fingertip of the user. Since a fingerprint sensor needs to be constructed in a size approximately equal to the area (around 20 mm by 20 mm) of a fingertip, there has also been the problem of high cost when forming sensors from single-crystal silicon substrates. In addition, in a construction where capacitance detection circuits that are combinations of sensor electrodes and transistors are disposed in a matrix, if the data lines that are the signal transmitting paths are respectively connected to a plurality of capacitance detection circuits, when the information of the capacitance detection circuits inside the matrix is read, the output information of the capacitance detection circuits in the same column but on previous rows remains and the initial potential of the data lines is not stable, so that there has been the problem that stable sensing has not been possible. In other words, when a plurality of circuits are connected to the same data line and successive data is read, the detection signals outputted from the later capacitance detection circuits will be affected by the detection signals outputted from the earlier capacitance detection circuits.

An aspect of the invention can provide a capacitance detection apparatus, a fingerprint sensor, and a biometric authentication apparatus that solve the above problems and make highly precise and stable sensing possible. Further the invention to provide a method that can carry out sensing of capacitance with high precision.

A capacitance detection apparatus, a fingerprint sensor, and a biometric authentication apparatus according to aspects of the invention can read convex/concave information on a subject surface using detection signals corresponding to a capacitance formed between the apparatus and the subject surface. A detection unit in which a plurality of capacitance detection circuits, which output the detection signals to signal transmitting paths, can be disposed, and an amplifying circuit that amplifies the detection signals outputted to the signal transmitting paths can be included. In particular, the respective signal transmitting paths are each connected to at least two of the capacitance detection circuits, and a resetting device for resetting a potential of the signal transmitting paths before the detection signals are outputted from the capacitance detection circuits to the signal transmitting paths is also included.

The above capacitance detection apparatus can preferably also include a reset period setting device for setting a ratio between a reset period during which the resetting device resets the potential of the signal transmitting paths and a sensing period during which the capacitance detection circuits output the detection signals.

Also, for the capacitance detection apparatus described above, a sensing period during which the capacitance detection circuits output the detection signals should preferably be set as a longer period than a reset period during which the resetting device resets the potential of the signal transmitting paths.

Here, the expression biometric authentication apparatus refers to an apparatus equipped with a function for authentication individuals using fingerprint information as biometric information, and includes a variety of card media such as IC cards, cash cards, credit cards, and ID cards, and also all kinds of security systems, such as a user authentication apparatus for online trading, a room entry/exit controlling apparatus, and an authentication apparatus for a computer terminal apparatus.

An exemplary driving method for a capacitance detection apparatus according to the invention drives a capacitance detection apparatus including a signal outputting element that outputs a detection signal corresponding to a capacitance formed between the capacitance detection apparatus and a subject surface, a signal transmitting path for supplying the detection signal to an amplification circuit, a selection transistor for controlling a connecting and a disconnecting of the signal transmitting path and the signal outputting element, and a power supply line for supplying a predetermined voltage to the signal outputting element. In particular, the driving method can include a disconnecting step of placing the selection transistor in a closed state to electrically disconnect the signal transmitting path and the signal outputting element, a resetting step of resetting the signal transmitting path to a predetermined potential, a connecting step of placing, after the signal transmitting path has been reset, the selection transistor in an open state to electrically connect the signal transmitting path and the signal outputting element, and a sensing step of supplying a detection signal from the signal outputting element to the amplification circuit via the signal transmitting path and amplifying the detection signal.

In the exemplary driving method described above, it should preferably be possible to change a ratio between a period during which the resetting step is executed and a period during which the sensing step is executed. Also in the exemplary driving method described above, a period during which the sensing step is executed can be changed should preferably be set longer than a period during which the resetting step is executed.

BRIEF DESCRIPTION OF THE DRAWINGS

The invention will be described with reference to the accompanying drawings, wherein like numerals reference like elements, and wherein.

DETAILED DESCRIPTION OF PREFERRED EMBODIMENTS

A first exemplary embodiment of the invention will now be described with reference to the drawings.

Figure 1:
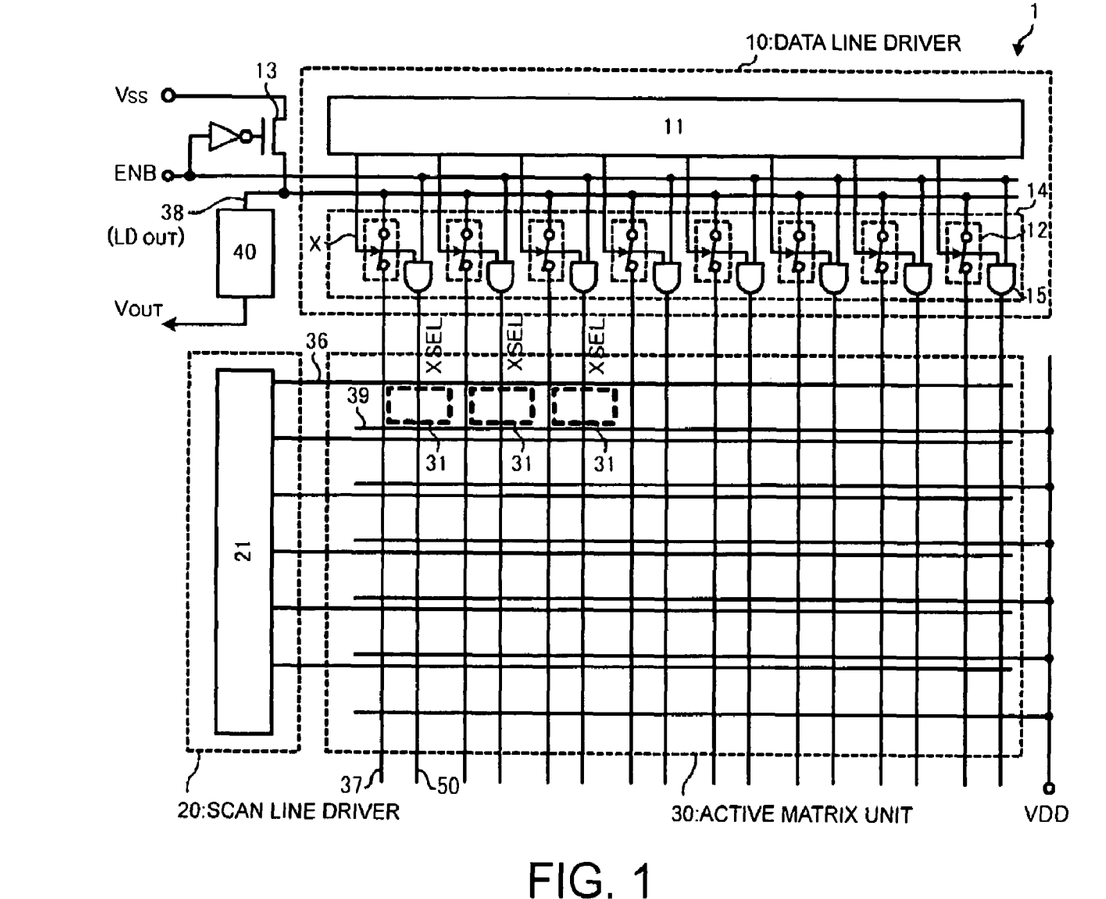
FIG. 1 is an exemplary block diagram of a capacitance-type fingerprint sensor according to an embodiment of the present invention.

FIG. 1 is an exemplary block diagram showing a capacitance-type fingerprint sensor 1 that is a capacitance detection apparatus according to the invention. As shown in FIG. 1, the fingerprint sensor 1 can include a data line driver 10 for selecting data lines 37 that are signal transmitting paths, a scan line driver 20 for selecting scan lines 36, an active matrix unit 30 that functions as a fingerprint detection unit, and an amplification circuit 40 for amplifying detection signals. The data line driver 10 can include a shift register 11 that decides the timing at which the data lines 37 are successively selected and a reset period selecting circuit 14 that sets a reset period. The reset period selecting circuit 14 includes analog switches 12, which connect and disconnect the respective data lines 37 and a global data line 38, and logical AND circuits 15, which take a logical AND between a column select signal of the shift register 11 and an enable signal ENB.

The scan line driver 20 can include a shift register 21 that decides the timing at which the data lines 37 are successively selected. In the active matrix unit 30, capacitance detection circuits 31 are arranged in a matrix (of M rows and N columns), with M scan lines 36 and M power supply lines 39 being laid out in the row direction and N data lines 37 and N data select lines 50 being laid out in the column direction. The data lines 37 are collectively connected to the single global data line 38 that is connected to the amplification circuit 40. The global data line 38 is also connected to a data line resetting transistor 13 for supplying a reset voltage $V_{SS}$ to the data lines 37.

In the above-described construction, when the M scan lines 36 are activated one line at a time, at any given time the N data lines 37 arranged on the active scan line 36 are driven in a point-sequential manner by being sequentially selected by the analog switch 12 and connected to the amplification circuit 40.

Here, the data line resetting transistor 13, the reset period selecting circuit 14, a driver (not shown) that outputs an ENB (enable) signal that defines the reset period, and a power supply circuit (also not shown) that supplies the reset voltage $V_{SS}$ to the data lines 37 operate in concert to realize a resetting device. The reset period selecting circuit 14, the driver (not shown) that outputs the ENB (enable) signal that defines the reset period also operate in concert to form a reset period setting device. The resetting device and reset period setting device are not necessarily realized by a plurality of hardware components, and may be realized by single hardware components.

Figure 2:
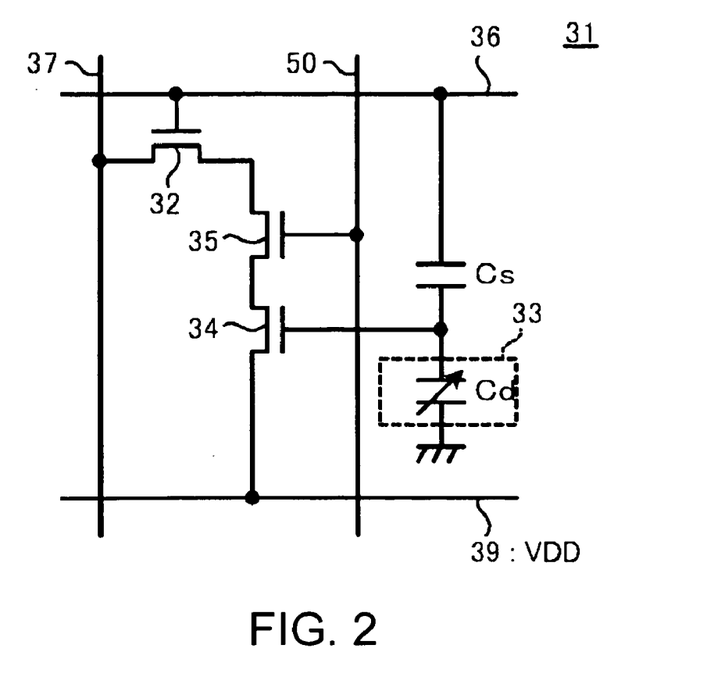
FIG. 2 is an exemplary circuit diagram of a capacitance detection circuit provided in the above fingerprint sensor.

FIG. 2 is an exemplary circuit diagram for a capacitance detection circuit 31 that converts convex/concave information on the fingerprint of the subject to an electric signal. The capacitance detection circuit 31 can include a selecting transistor 32 and a data line selecting transistor 35 for selecting the present capacitance detection circuit 31, a capacitance 33 that is formed between the fingertip of the subject and a sensor electrode, a signal amplifying transistor 34 that outputs a detection signal that carries the convex/concave information of the fingerprint based on minute variations in the capacitance 33, the scan lines 36 that transmit signals for opening/closing control of the selecting transistor 32, the data select line 50 that transmits a signal for opening/closing control of the data line selecting transistor 35, the data line 37 for transmitting the detection signal, the power line 39 for supplying a voltage $V_{DD}$ to the signal amplifying transistor 34, and a reference capacitance Cs of a fixed capacitance.

Figure 7:
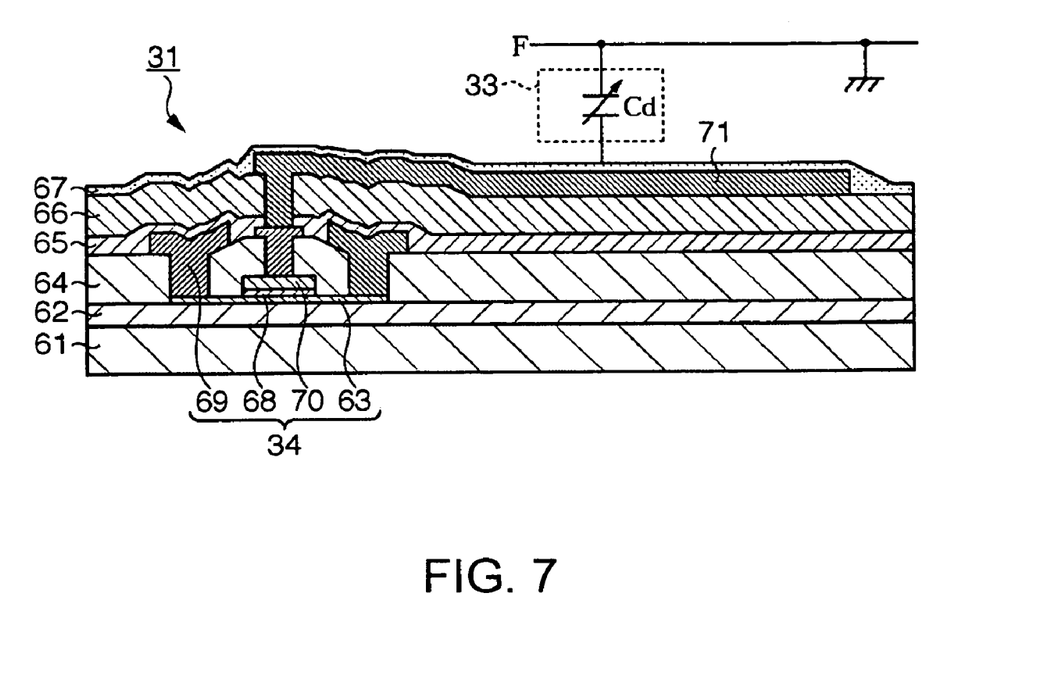
FIG. 7 is a cross-sectional view of the above capacitance detection circuit.

If the detected capacitance for the capacitance 33 is expressed as Cd, the detected capacitance Cd is determined in accordance with the distance between the convexes and concaves of the subject's fingerprint and the sensor electrode (see FIG. 7).

In the above-described construction, when the scan line 36 is activated in accordance with the successive selection of lines by the scan line driver 20, the selecting transistor 32 is placed in the open state. As a result, a detection current determined by the gate potential of the signal amplifying transistor 34 flows in the data line 37. The gate potential of the signal amplifying transistor 34 is determined by the respective ratios between the parasitic capacitance Ct (not shown) of the signal amplifying transistor 34 itself, the reference capacitance Cs, and the detected capacitance Cd.

For example, when the fingertip of the subject has approached the surface of the capacitance detection apparatus, if a convex part of the fingerprint becomes adjacent to the sensor electrode, the detected capacitance Cd of the capacitance 33 becomes sufficiently larger than the parasitic capacitance Ct and the reference capacitance Cs, so that the gate potential of the signal amplifying transistor 34 approaches ground potential. As a result, the signal amplifying transistor 34 is placed in a substantially off state with only an extremely small current flowing between the source and drain of the signal amplifying transistor 34.

On the other hand, if a concave part of the fingerprint becomes adjacent to the sensor electrode, the detected capacitance Cd becomes sufficiently smaller than the parasitic capacitance Ct and the reference capacitance Cs, so that the gate potential of the signal amplifying transistor 34 approaches a high potential $V_{DD}$. As a result, the signal amplifying transistor 34 is placed in a substantially on state with a larger current than the extremely small current mentioned above flowing between the source and drain of the signal amplifying transistor 34.

Here, since the source terminal of the signal amplifying transistor 34 is connected to the high-potential power line 39, the direction of the current flowing through the signal amplifying transistor 34 is oriented from the capacitance detection circuit 31 to the data line 37.

Figure 3:
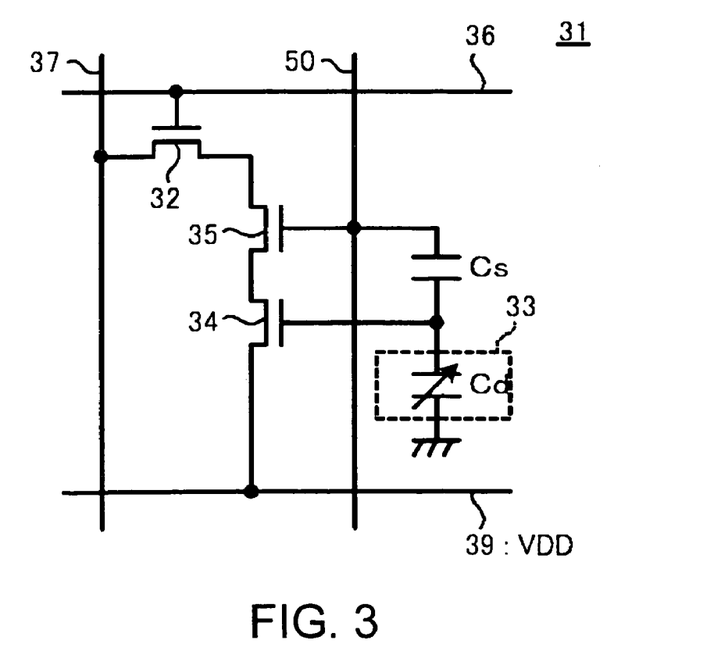
FIG. 3 is an exemplary circuit diagram of a capacitance detection circuit according to a modification of FIG. 2.

FIG. 3 shows another example of a capacitance detection circuit 31. Parts that functionally correspond to components of the capacitance detection circuit 31 shown in FIG. 2 have been given the same reference numerals. In the capacitance detection circuit 31 shown in FIG. 2, the high potential-side terminal of the reference capacitance Cs is connected to the scan line 36, but in the example in FIG. 3, the potential-side terminal of the reference capacitance Cs is connected to the data select line 50. In the examples in both FIG. 2 and FIG. 3, when the capacitance detection circuit 31 is selected, a selection signal is supplied to the scan line 36 and the data select line 50, so that both capacitance detection circuits 31 can achieve the same function.

In the exemplary embodiment, as a preliminary stage before the detection signal is outputted on the data line 37, the data line 37 is reset to a predetermined voltage $V_{SS}$ to stabilize the potential of the data line 37. The data line selecting transistor 35 carries out control to electrically connect and disconnect the data line 37 and the signal amplifying transistor 34, and is controlled so as to be placed in a closed state when the data line 37 has been reset. Opening and closing control of the data line selecting transistor 35 is controlled by the data select line 50.

Figure 4:
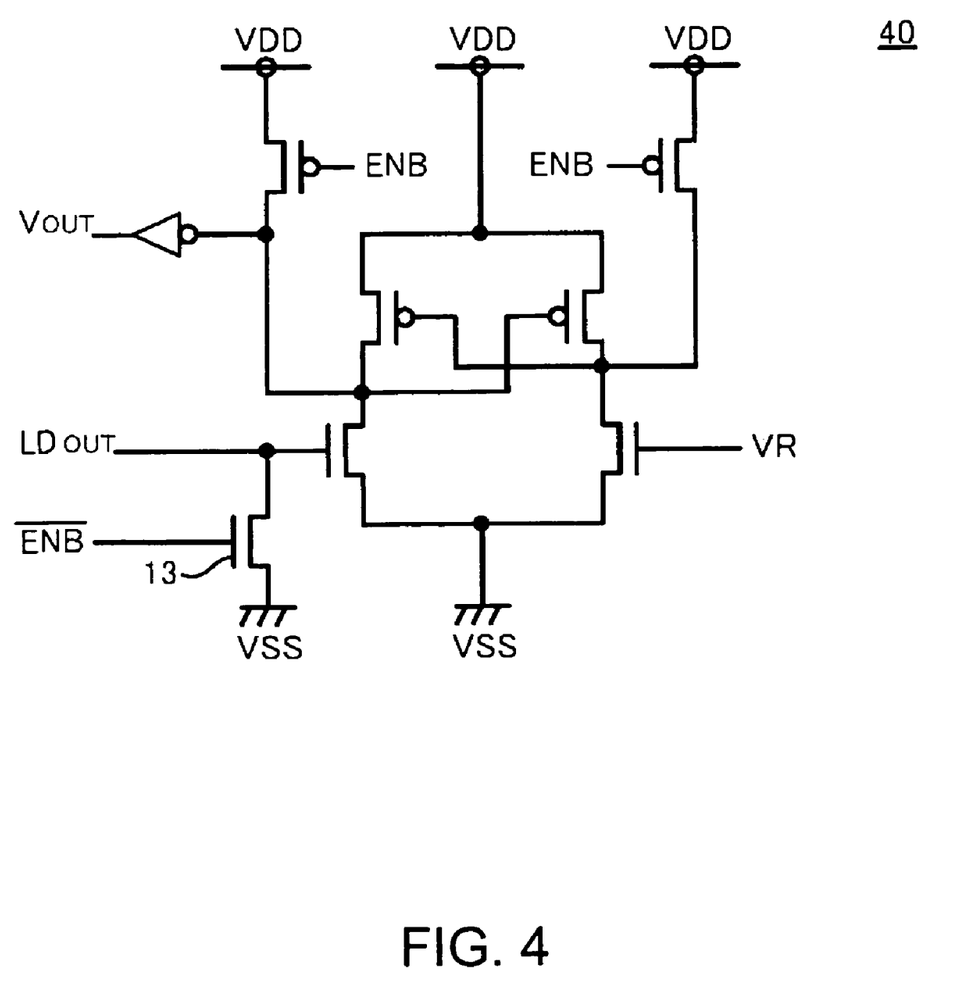
FIG. 4 is an exemplary circuit diagram of an amplification circuit provided in the above fingerprint sensor.

FIG. 4 is an exemplary circuit diagram of the amplification circuit 40 that amplifies the detection signals of the capacitance detection circuits 31. A voltage signal $LD_{OUT}$ outputted from a data line 37 to the global data line 38 is inputted into an input terminal of the amplification circuit 40. The amplification circuit 40 compares the input voltage $LD_{OUT}$ with a reference voltage VR and outputs a digital value as $V_{OUT}$. When the input voltage $LD_{OUT}$ is smaller than the reference voltage VR, the output voltage $V_{OUT}$ becomes a low-level potential ($V_{SS}$). Conversely, when the input voltage $LD_{OUT}$ is larger than the reference voltage VR, the output voltage $V_{OUT}$ becomes a high level potential ($V_{DD}$). By doing so, it is possible to obtain fingerprint information composed of binary data.

Figure 5:
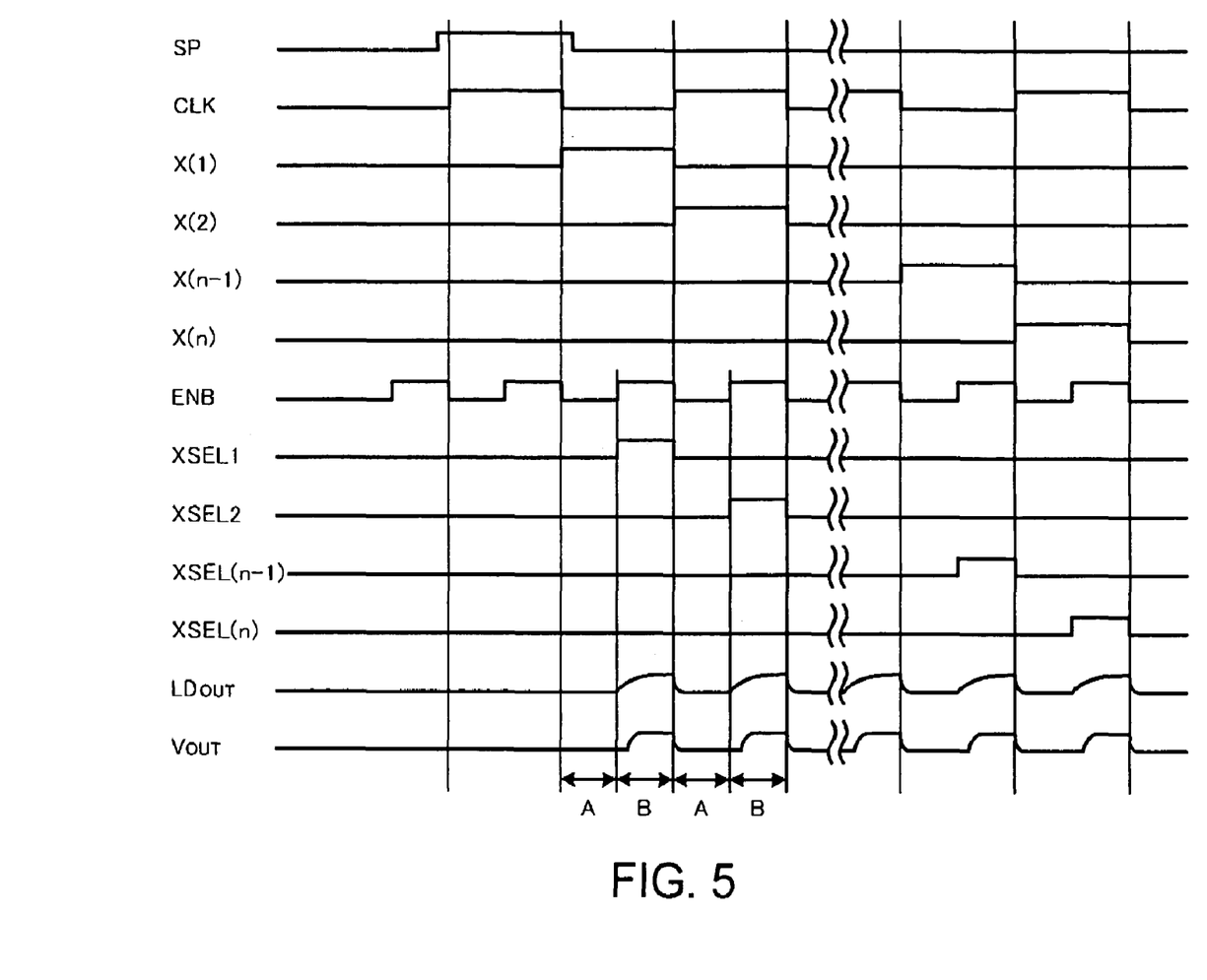
FIG. 5 is a timing chart for various signals in the above fingerprint sensor.

FIG. 5 is a timing chart for various signals outputted from the data line driver 10. In this chart, SP is a start pulse, CLK is a clock signal, X(1), X(2), . . . X(N) are output signals of the respective columns of the shift register 11, ENB is an enable signal for opening/closing control of the data line resetting transistor 13, XSEL(1), XSEL(2), . . . , XSEL(N) are select signals outputted on the data select lines 50, $LD_{OUT}$ is a voltage signal outputted from the data lines 37 to the global data line 38, and $V_{OUT}$ is an output signal of the amplification circuit 40. Out of a period during which one capacitance detection circuit 31 is selected by the successive selection of the shift register 11 inside the data line driver 10, a former half is set as a reset period A and the latter half is set as a sensing period B.

During the reset period A, the enable signal ENB is inactive (a logic level L) and the data line resetting transistor 13 is placed in an open state. When an output signal X(k) with a logic level H is outputted from the shift register 11, the $k^{th}$ analog switch 12 of the reset period selecting circuit 14 is placed in a connecting state so that the reset potential $V_{SS}$ is supplied to the $k^{th}$ data line 37. By doing so, the potential of the data line 37 in question is reset. It should be noted that at this time, the logic level of the enable signal ENB is L, so that the output of the logical AND circuit 15 of the reset period selecting circuit 14 is the logic level L and an L level signal is outputted to the data select line 50. This results in all of the data line selecting transistors 35 being placed in the closed state, and in the flow of current from the capacitance detection circuits 31 being suppressed.

Next, there is a transition to the sensing period B, and when the enable signal ENB becomes active (logic level H), the data line resetting transistor 13 is placed in the closed state, so that the reset voltage $V_{SS}$ and the data lines 37 are disconnected (resetting complete). On the other hand, an H-level output signal X(k) is supplied to the $k^{th}$ logical AND circuit 14b of the reset period selecting circuit 14 from the $k^{th}$ column of the shift register 11 and an H-level enable signal is supplied, so that an H-level signal is outputted on the data select line 50 that is the output line of the $k^{th}$ logical AND circuit 14b. When this happens, the data line selecting transistors 35 aligned in the $k^{th}$ column are placed in the open state. By doing so, the signal amplifying transistor 34 is connected to the data line selecting transistor 35 and via the selecting transistor 32 to the data line 37. In addition, in the amplification circuit 40 shown in FIG. 4, the enable signal ENB is activated so that the voltage outputted from a capacitance detection circuit 31 via the data line 37 is amplified by the amplification circuit 40.

Also, as described above, according to the exemplary embodiment, by carrying out a resetting operation for the potential of the data lines 37 in the preliminary stage of sensing, the potential of the data lines 37 is stabilized and the operation margin is widened. In addition, since the potential of the data lines 37 is stabilized, the fingerprint information can be detected at higher speed.

Figure 6:
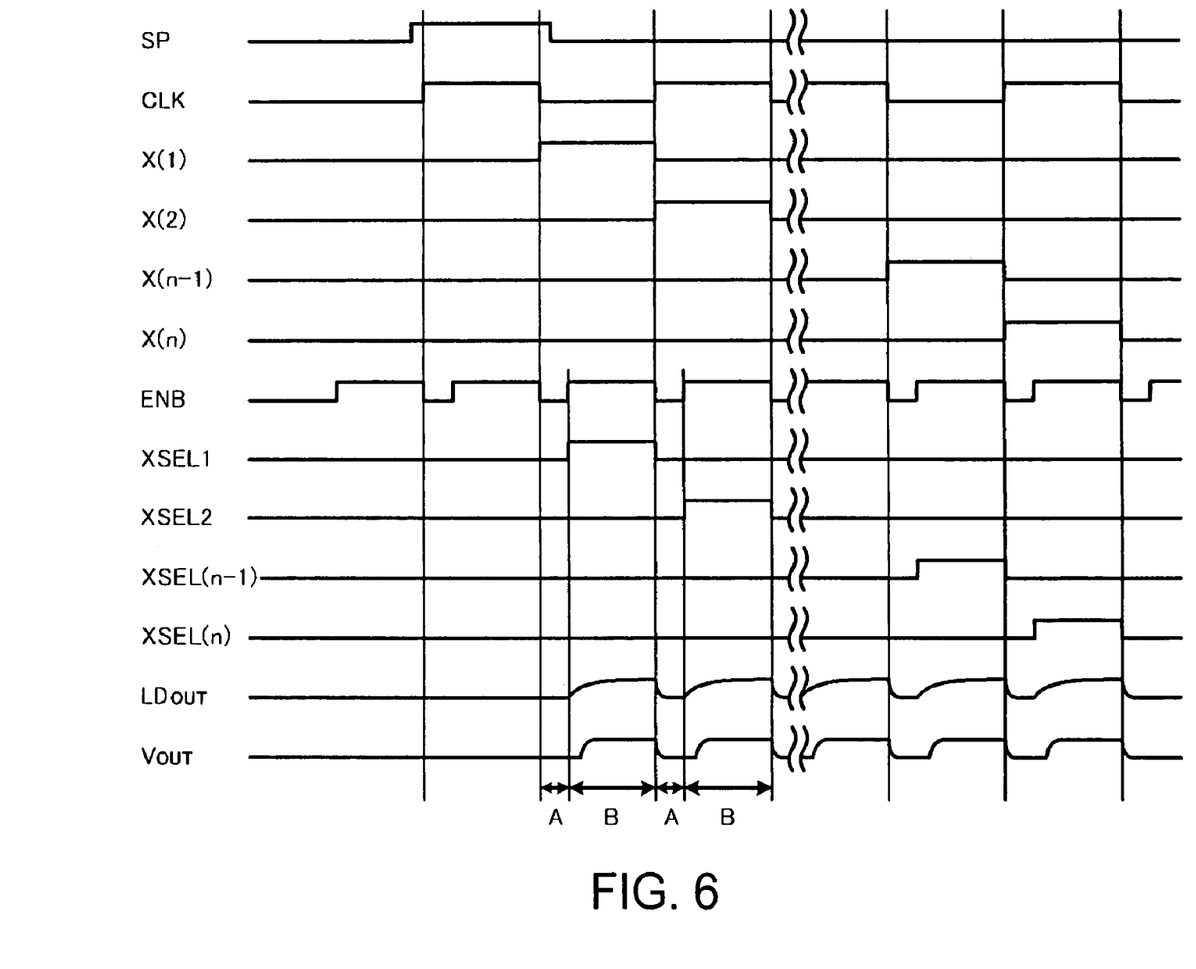
FIG. 6 is a timing chart for various signals according to a modification of FIG. 5.

It should be noted that in the exemplary timing chart shown in FIG. 5, the ratio between the reset period A and the sensing period B have a 1:1 relationship, but the invention is not limited to this, and as shown in FIG. 6, by changing the duty ratio of the enable signal, the ratio between the reset period A and the sensing period B (i.e., the duty ratio) may be adjusted. By shortening the reset period A and stabilizing the potential of the data lines 37 at a predetermined potential in a short time, it can be possible to maintain a sufficiently long sensing period. By doing so, highly precise sensing becomes possible. The power supply voltage for resetting is not limited to $V_{SS}$ described above, and it is possible to use any freely chosen voltage.

FIG. 7 is a cross-sectional construction diagram of a capacitance detection circuit 31 centered on the sensor electrode. As shown in FIG. 7, a signal amplifying transistor 34 that outputs a detection signal that carries the convex/concave information of a fingerprint and a sensor electrode (detection electrode) 71, between the fingertip F of the subject and which the capacitance 33 is formed, are formed in the capacitance detection circuit 31. The signal amplifying transistor 34 is a MOS transistor including a gate electrode 70, a gate insulating film 68, a polycrystalline silicon layer 63, and a source/drain electrode 69. The capacitance 33 is a variable capacitance that varies in accordance with the convex/concave pattern of a fingerprint. The potential of the fingertip F is set at a reference potential. The sensor electrode 71 is connected to the gate electrode 70, and is constructed so that variations in the detected capacitance Cd due to the convexes and concaves of the fingerprint are transmitted to the signal amplifying transistor 34 and variations in the capacitance can be sensed due to the amplifying action of a drain current flowing in a channel.

To manufacture the capacitance detection circuit 31 shown in FIG. 7, a base insulating film 62, of silicon oxide or the like, is laminated on the insulating substrate 61 and a film of amorphous silicon is formed thereon and crystallized to form the polycrystalline silicon layer 63. Next, the gate insulating film 68 and the gate electrode 70 are formed on the polycrystalline silicon layer 63, a dopant is introduced and dispersed in the polycrystalline silicon layer 63 to form the source and drain regions by self-alignment. Next, after a first interlayer insulating film 64 has been formed, contact holes are opened to form the source/drain electrode 69. In addition, the second interlayer insulating films 65, 66 are laminated, a contact hole is opened, and a sensor electrode 71 is formed. Finally, the entire surface is covered with a passivation film 67. Here, although the second interlayer insulating films 65, 66 have a two-layer construction so that the lower second interlayer insulating film 65 is kept flat and a desired thickness is obtained for the upper second interlayer insulating film 66, a single-layer construction may be used.

It should be noted that the formation of a semiconductor element, such as a transistor, on the insulating substrate 61 is not limited to the fabrication method described above, and for example a semiconductor element such as a transistor may be formed on the insulating substrate 61 by an exfoliation transfer technique disclosed by Japanese Unexamined Patent Publication No. H11-312811 or in S. Utsunomiya et. al. "Society for Information Display" p. 916 (2000). By using an exfoliation transfer technique, a low-cost substrate with appropriate strength, such as a plastic substrate or glass substrate, can be used as the insulating substrate 61, so that the mechanical strength of the capacitance-type fingerprint sensor 1 can be increased.

Figure 8:
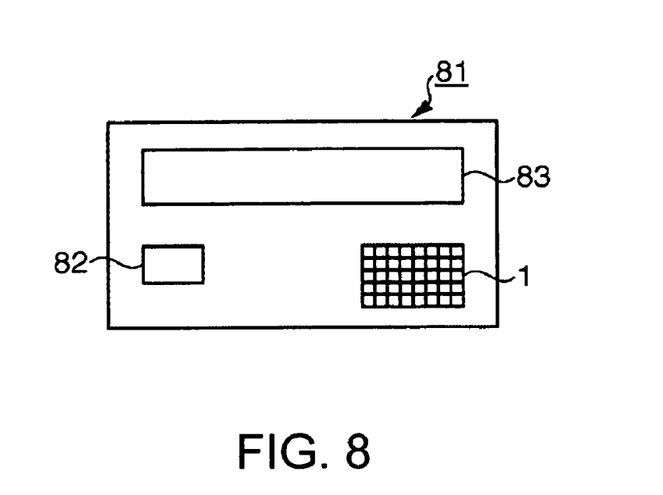
FIG. 8 shows an application equipped with the above fingerprint sensor.

Next, an example application of the capacitance-type fingerprint sensor 1 will be described. FIG. 8 is an exemplary block diagram of a smart card 81 which can include the capacitance-type fingerprint sensor 1 described above, an IC chip 82, on which a CPU, a memory element, and the like are mounted, and a display apparatus 83, such as a liquid crystal display. Fingerprint information on the card owner is registered in the IC chip 82 as biometric information.

Figure 9:
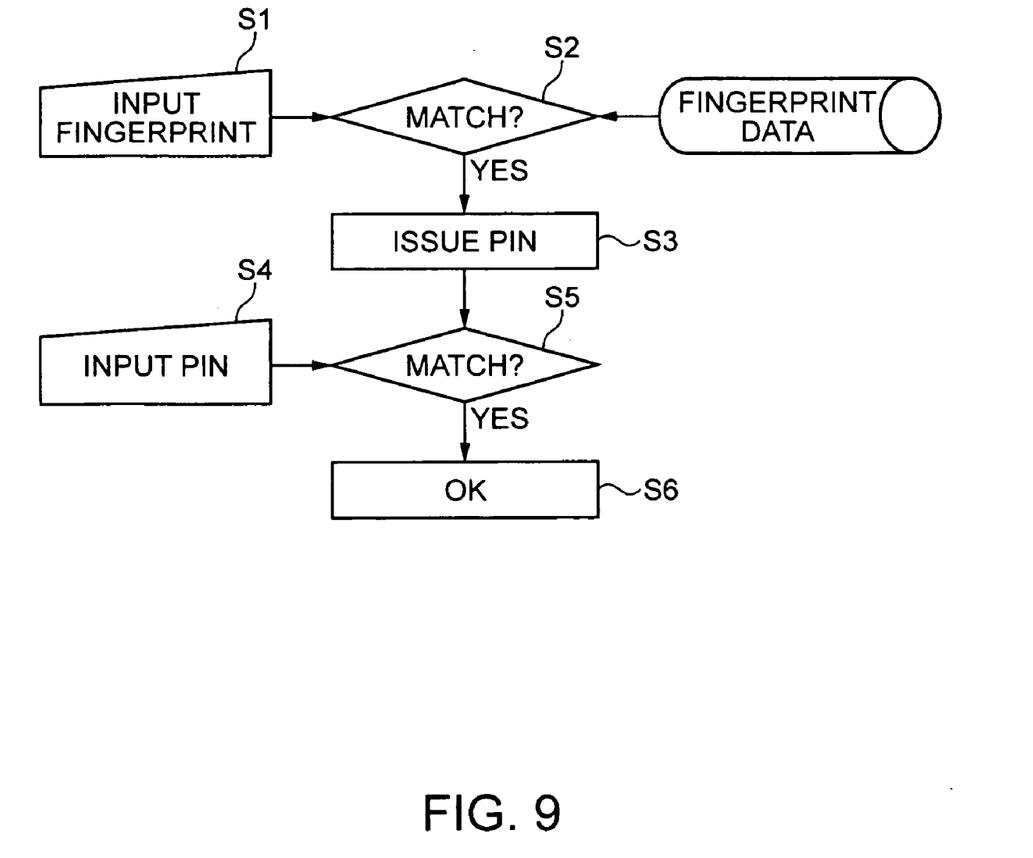
FIG. 9 is a flowchart showing an exemplary authentication procedure for a smart card that uses the above fingerprint sensor.

FIG. 9 shows an authentication procedure for the smart card 81. By having the user touch the fingerprint sensor 1 with his or her fingertip, fingerprint information is inputted into the smart card 81 (step S1) and the fingerprint information is compared with fingerprint information registered in advance (step S2). Here, when the fingerprint matches ("YES" in step S2), a personal identification number (PIN) is issued (step S3). Next, a PIN is inputted by the card owner (step S4). It is then checked whether the PIN issued in step S3 matches the PIN inputted in step S4 (step S5), and when the numbers match ("YES" in step S5), usage of the card is permitted (step S6).

In this way, by authentication the user using fingerprint information in addition to the security number, it is possible to provide a high-security smart card. A smart card equipped with a biometric authentication function can be used as a cash card, a credit card, an identification card, and the like. The fingerprint sensor according to the exemplary embodiment can be applied to all kinds of biometric authentication apparatus for authentication individuals. For example, the embodiment can be applied to a system in which a fingerprint sensor according to the embodiment is attached to a door as a security system for controlling entry/exit for a room, fingerprint information on an entrant inputted by the fingerprint sensor is compared with fingerprint information registered in advance, entry into the room is permitted when such information matches, entry is prohibited when the information does not match, and a security firm or the like is informed as necessary. For online trading that is conducted via an open network such as the Internet, the fingerprint sensor according to the present embodiment can be effectively applied to a biometric authentication apparatus for verifying individuals. In addition, the sensor has a wide range of applications, such as in a user authentication apparatus of a computer terminal apparatus or in a control apparatus for users of a copier.

It should be noted that although an example of a fingerprint sensor has been described as an exemplary embodiment of a capacitance detection apparatus of the invention, the invention is not limited to this, and can be applied to all kinds of reader apparatuses that read a minute convex/concave pattern of a subject as minute variations in capacitance. As one example, the invention can be applied to authentication of noseprints and the like of animals.

What is claimed is:

1. A capacitance detection device comprising:
   a plurality of capacitance detection circuits that output detection signals to signal transmitting paths;
   a resetting circuit that resets a potential of each of the signal transmitting paths;
   a plurality of transistors each of which controls an electrical connection between one signal transmitting path of the signal transmitting path and a reset potential that resets the one signal transmitting path, each of the plurality of transistors having a gate that receives an input signal supplied from a shift register; and,
   a reset period setting device that sets a ratio between a reset period during which the resetting circuit resets the potential of each of the signal transmitting paths and a sensing period during which the capacitance detection circuits output the detection signals to the signal transmitting paths.

2. The capacitance detction device according to claim 1, a sensing period during which the capacitance detection circuits output the detection signals being set as a longer period than a reset period during which the resetting circuit resets the potential of each of the signal transmitting paths.

3. A fingerprint sensor comprising:
   the capacitance detection device of claim 1.

4. A biometric authentication device comprising:
   the capacitance detection device according to claim 1.

5. The capacitance detection device according to claim 1, each of the plurality of transistors controlling an electrical connection between the one signal transmitting path and a global data line of which potential is set to the reset potential at least for a predetermined period.

6. A capacitance detection device, comprising:
   a plurality of capacitance detection circuits that output detection signals to signal transmitting paths;
   a plurality of transistors each of which controls an electrical connection between one signal transmitting path of a plurality of transmitting paths and a global data line, the detection signals being supplied to the global data line through the plurality of transistors during a first period;
   a reset signal being supplied to each of the signal transmitting paths through one of the plurality of transistors during a second period; and
   a reset period setting device that sets a ratio between a reset period during which the resetting circuit resets the potential of each of the sianal transmitting paths and a sensing period during which the capacitance detection circuits output the detection sianals to the signal transmitting paths.

7. The capacitance detection device according to claim 6, a sensing period during which the capacitance detection circuits output the detection signals being set as a longer period than a reset period during which the resetting circuit resets the potential of each of the signal transmitting paths.

8. A fingerprint sensor comprising:
   the capacitance detection device according to claim 6.

9. A biometric authentication device comprising:
   the capacitance detection device according to claim 6.

10. A capacitance detection device comprising:
    a plurality of data lines;
    a plurality of scan lines;
    a resetting circuit that resets a potential of each of the plurality of data lines; and
    a plurality of capacitance detection circuits, each of the plurality of detection circuits including:
  a selecting transistor whose gate receives a scan signal supplied from one scan line of the plurality of scan lines, the selecting transistor having a first terminal that is coupled to one data line of the plurality of data lines, a second terminal, and a channel region disposed between the first terminal and the second terminal;
  a signal amplifying transistor that is coupled to the second terminal; and
  a sensor electrode that is coupled to a gate of the signal amplifying transistor.

11. The capacitance detection device according to claim 10, further comprising a plurality of data select lines,
  each of the plurality of detection circuits further including a data selecting transistor that is disposed between the selecting transistor and the signal amplifying transistor.

12. The capacitance deCection device according to claim 11, the resetting circuit including a plurality of analog switches and a plurality of logical AND circuits,
  wherein one analog switch of the plurality of analog switches is connected to each of the plurality of data lines, and wherein one logical AND circuit of the plurality of logical AND circuits is connected to each of the plurality of data select lines.

13. The capacitance detection device according to claim 10, a capacitance being formed between the sensor electrode and an object to be detected.

14. The capacitance detection device according to claim 13, the object being a fingertip.

* * * * *